US009162158B2

(12) United States Patent
Ba-abbad

(10) Patent No.: US 9,162,158 B2
(45) Date of Patent: Oct. 20, 2015

(54) METHOD AND APPARATUS FOR PURIFYING WATER

(75) Inventor: Mazen A. Ba-abbad, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 880 days.

(21) Appl. No.: 13/049,033

(22) Filed: Mar. 16, 2011

(65) Prior Publication Data

US 2012/0234665 A1     Sep. 20, 2012

(51) Int. Cl.
| | | |
|---|---|---|
| *B01D 3/04* | (2006.01) | |
| *F28B 1/06* | (2006.01) | |
| *B01D 1/00* | (2006.01) | |
| *B01D 5/00* | (2006.01) | |
| *C02F 1/14* | (2006.01) | |

(52) U.S. Cl.
CPC ............ *B01D 1/0035* (2013.01); *B01D 1/0058* (2013.01); *B01D 3/04* (2013.01); *B01D 5/006* (2013.01); *B01D 5/0039* (2013.01); *C02F 1/14* (2013.01); *F28B 1/06* (2013.01); *Y02W 10/37* (2015.05); *Y10S 203/08* (2013.01); *Y10S 203/90* (2013.01)

(58) Field of Classification Search
CPC .............. C02F 1/048; C02F 1/14; C02F 1/16; C02F 9/00; C02F 2303/10; F22B 1/18; F02G 2260/00; Y02W 10/37; B01D 1/0035; B01D 1/0041; B01D 1/0058; B01D 1/14; B01D 3/007; B01D 3/02; B01D 3/04; B01D 3/38; B01D 3/143; B01D 5/0027; B01D 5/006; B01D 5/0075; B01D 5/0039; F28B 1/06; Y10S 159/08; Y10S 159/13; Y10S 159/23; Y10S 159/32; Y10S 159/901; Y10S 159/903; Y10S 165/331; Y10S 165/448; Y10S 165/911; Y10S 165/913; Y10S 165/916; Y10S 203/01; Y10S 203/08; Y10S 203/90
See application file for complete search history.

(56) References Cited

U.S. PATENT DOCUMENTS

| | | | | |
|---|---|---|---|---|
| 2,838,135 A | * | 6/1958 | Pilo et al. ........................ | 95/189 |
| 2,979,442 A | * | 4/1961 | Badger ............................ | 203/7 |
| 3,248,181 A | * | 4/1966 | Akimoto ........................ | 23/300 |
| 3,447,891 A | * | 6/1969 | Crawford ........................ | 422/9 |
| 3,467,587 A | * | 9/1969 | Connell et al. ................ | 202/173 |
| 3,476,654 A | * | 11/1969 | Sieder ............................ | 203/7 |
| 3,557,863 A | * | 1/1971 | Becker ........................ | 159/4.02 |

(Continued)

FOREIGN PATENT DOCUMENTS

CA     2274724     * 12/2000

*Primary Examiner* — Virginia Manoharan
(74) *Attorney, Agent, or Firm* — Timberline Patent Law Group PLLC

(57) ABSTRACT

The invention provides a method and apparatus for purifying water. The apparatus includes a water still for receiving water and a hot air maintained in a heat-exchanging relationship to obtain a hot water and a cold air. The apparatus also includes one or more water purification units configured to receive the hot water from the water still in which the hot water is further heated using thermal energy received from one or more thermal energy sources to obtain steam and waste matter. A water purification unit of the one or more water purification units includes a waste matter remover for removing the waste matter from the water purification unit. The water still includes a heat-exchanging unit configured to receive the steam from the one or more water purification units. The steam received at the heat-exchanging unit is condensed to obtain purified water within the heat-exchanging unit using the cold air.

4 Claims, 13 Drawing Sheets

(56) References Cited

U.S. PATENT DOCUMENTS

| | | | |
|---|---|---|---|
| 3,923,607 A * | 12/1975 | Tabata et al. | 203/7 |
| 4,150,958 A * | 4/1979 | Jablin | 95/199 |
| 5,168,728 A * | 12/1992 | Djelouah et al. | 62/532 |
| 7,357,849 B2 * | 4/2008 | Wright | 203/10 |
| 7,897,019 B2 * | 3/2011 | Akers | 203/10 |
| 8,183,456 B1 * | 5/2012 | Schroeder et al. | 136/200 |
| 8,328,995 B2 * | 12/2012 | Eddington | 203/10 |
| 8,545,681 B2 * | 10/2013 | Shapiro et al. | 203/10 |
| 2003/0089590 A1 * | 5/2003 | Paxton et al. | 203/2 |

* cited by examiner

METHOD AND APPARATUS FOR PURIFYING WATER

FIELD OF THE INVENTION

The present invention generally relates to purification of water, and more specifically, to a method and apparatus for purifying water using thermal energy.

BACKGROUND OF THE INVENTION

Nowadays, there is an increase in demand for treating water due to rising population and increased urbanization. Treatment of the water is required for obtaining healthy potable water. Therefore, there has been a demand for apparatuses and processes for obtaining fresh water from salt water or contaminated water. Contaminated and polluted ground water can be rendered drinkable through a variety of purification processes. For example, such water purification processes may include filtration, biological treatment, thermal water desalination, reverse osmosis, and distillation. Reverse osmosis processes typically produce large amounts of concentrated contaminated waste as a byproduct along with purified water. The concentrated contaminated waste may be environmentally hazardous. Further, a ratio of purified water to contaminated water decreases with increase in level of contamination in the contaminated water. Thus, the reverse osmosis process rejects a large quantity of water. Additionally, in reverse osmosis processes, contaminated water needs pre-filtration, cooling, and chemical treatment prior to being treated. Finally, membrane used in the reverse osmosis process needs a periodic replacement which is costly.

In many applications, distillation is regarded as superior to other purification processes due to usefulness of this process in distilling fresh water from salt water, and in removing toxic chemicals from contaminated water. However, a typical distillation process uses filtration operations that generate salts or contaminants as residue when the salt water or the contaminated water is converted into steam. These salts and contaminants left behind as residue cause scaling and "blow-down" in filters. Blow-down is the process that involves settling of mineral deposits in the filters. The scaling and the "blow-down" in the filters, in turn has detrimental effects on purifying ability of the distillation process. Furthermore, in order to efficiently purify the water using the distillation process, the filters require frequent maintenance to overcome the scaling and the "blow-down".

Additionally, these distillation processes utilize thermal energy from metered energy or other expensive energy sources for converting the contaminated water into steam. Further, condensation of the steam by bringing the steam to a lower temperature to obtain a purified water also requires expensive forms of energy.

Therefore, there is a need for a method and apparatus for purifying water by reusing thermal energy derived from efficient energy sources and with less water rejects. Additionally there is a need for effective removal of contaminants that remain when contaminated water is converted into the steam.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1A:
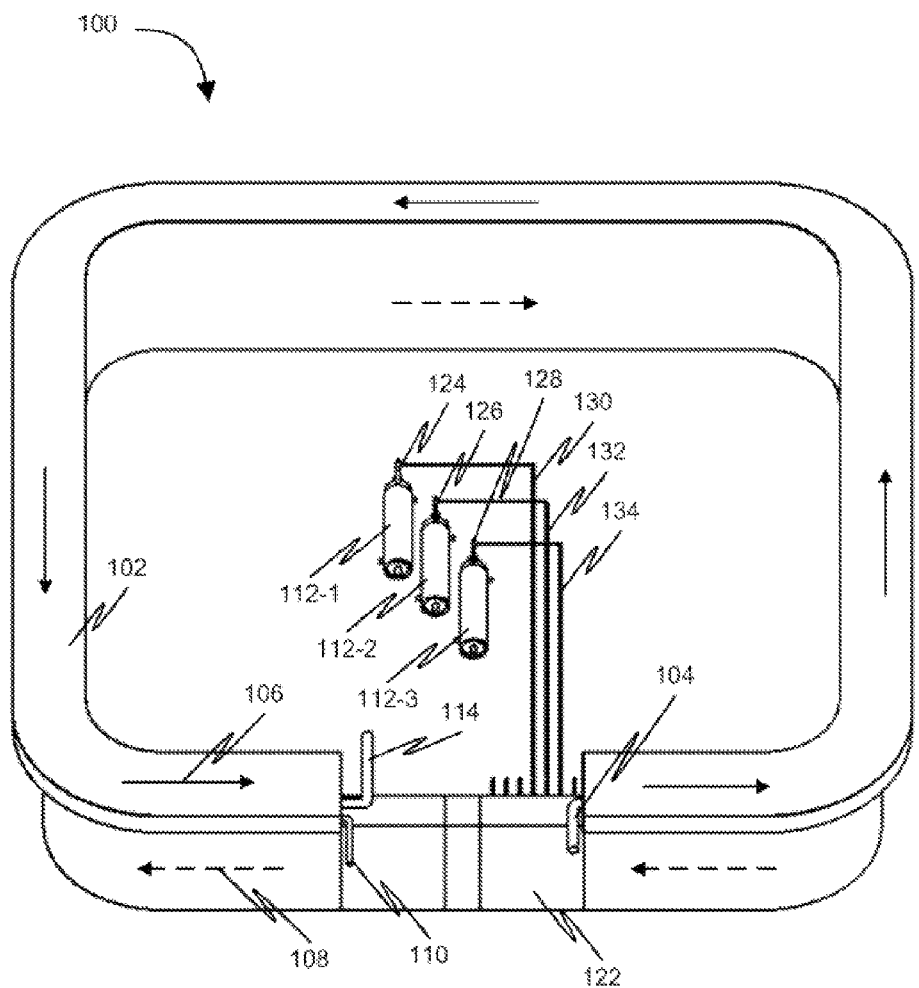
FIG. 1A and FIG. 1B illustrate an apparatus for purifying water in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to method and apparatus for purifying water. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

Various embodiments of the invention provide a method and apparatus for purifying water. The apparatus includes a water still for receiving water and a hot air. The water and the hot air are maintained in a heat-exchanging relationship within the water still to obtain a hot water, water vapor, and a cold air. The water vapor is condensed into a distilled water within the water still using the cold air. The apparatus also includes one or more water purification units configured to receive the hot water from the water still. Upon receiving the hot water, the hot water is further heated in the one or more water purification units using thermal energy received from one or more thermal energy sources to obtain steam and waste matter. The one or more thermal energy sources may include, but are not limited to, a hot water, a hot cooling fluid, a hot oil, an exhaust air, a refrigerant, and one or more hot exhaust gases. The one or more thermal energy sources may be obtained from an engine. A water purification unit of the one or more water purification units includes a waste matter remover for removing the waste matter from the water purification unit. The water still includes a heat-exchanging unit configured to receive the steam from the one or more water purification units. The steam received at the heat-exchanging unit is condensed to obtain purified water within the heat-exchanging unit using the cold air.

Figure 1B:
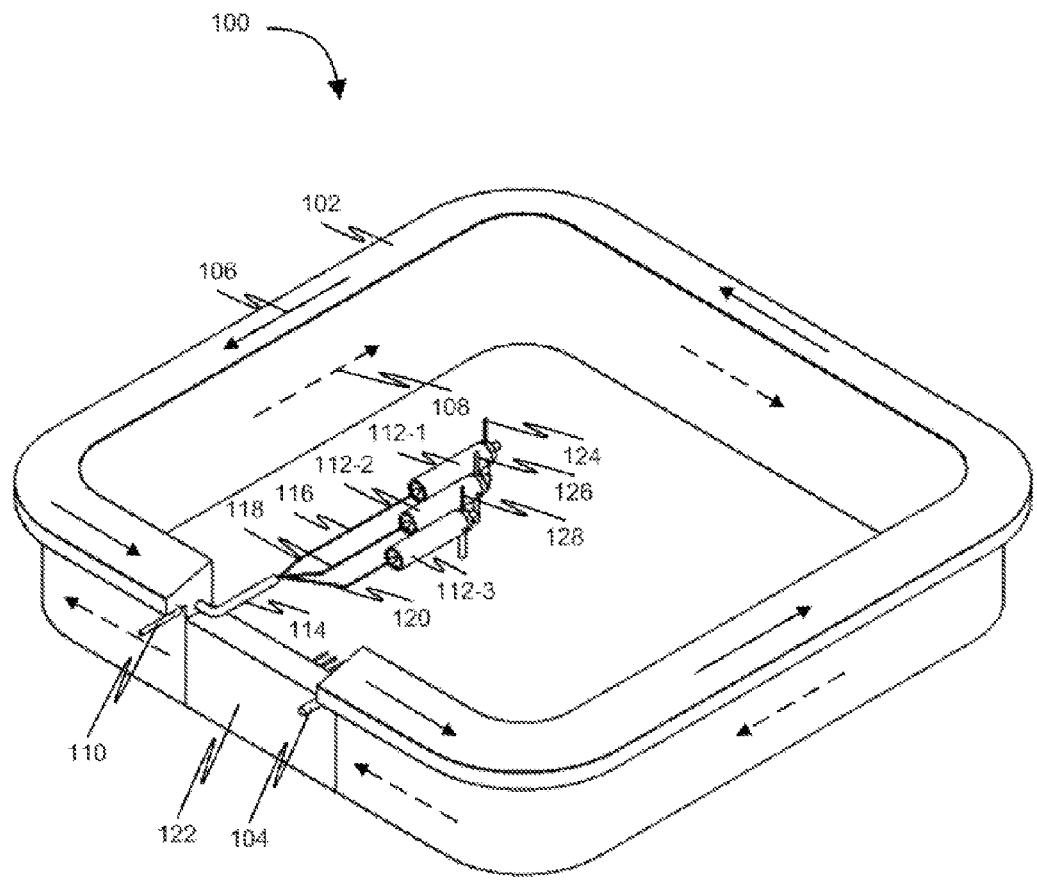

FIG. 1A and FIG. 1B illustrate an apparatus 100 for purifying water in accordance with an embodiment of the invention. The water to be purified by apparatus 100 may be received from external sources. For example, the water may include, but is not limited to, salt water, contaminated water, raw water, brine water, and sewage water. As shown in FIG. 1A, apparatus 100 includes a water still 102 for receiving the water to be purified. A structure of water still 102 as illustrated in FIG. 1A and FIG. 1B is according to an embodiment of the invention. However, water still 102 present in apparatus 100 may have any other structure. The water is received by water still 102 through a pipe 104 connected to water still 102. For example, an external water source may be connected to continuously supply the water to water still 102. Upon receiving the water, the water is circulated in water still 102 in a direction indicated by an arrow 106. Further, a hot air is circulated in water still 102 in a direction indicated by an arrow 108. The generation of the hot air in water still 102 is explained in detail in conjunction with FIG. 9. The hot air and the water are circulated within water still 102 in a heat-exchanging relationship. As a result, the water is heated up due to transfer of thermal energy from the hot air to the water. In an embodiment, the water may be heated using solar energy received by water still 102. Alternatively, water still 102 may include a heating coil (not shown in FIG. 1A and FIG. 1B) for heating the water. Further, water still 102 may include any other arrangement known in the art for heating the water within water still 102.

Upon heating the water, a hot water, water vapor and a cold air is obtained. The cold air obtained is circulated within water still 102. The water vapor obtained may condense to produce distilled water within water still 102. The method of condensation of water vapor to obtain the distilled water is explained in detail in conjunction with FIG. 9. The distilled water is collected through a pipe 110 connected to water still 102. The distilled water thus obtained may be further processed and used for various purposes known in the art.

The hot water obtained in response to heating the water within apparatus 100 is received by a plurality of water purification units 112-n. Plurality of water purification units 112-n includes a water purification unit 112-1, a water purification unit 112-2, and a water purification unit 112-3 as shown in FIG. 1A and FIG. 1B. However, an apparatus such as, apparatus 100 may include one or more water purification units for heating the water. Plurality of water purification units 112-n receive the hot water from a pipe 114 connected to water still 102 as shown in FIG. 1B. In an embodiment, water purification unit 112-1, water purification unit 112-2, and water purification unit 112-3 may be connected to pipe 114 using a pipe 116, a pipe 118, and a pipe 120 respectively for receiving the hot water from pipe 114. Alternatively, plurality of water purification units 112-n may receive the hot water from three separate pipes similar to pipe 114 connected to water still 102 for receiving the hot water. In an alternate embodiment, a pipe connected to pipe 114 of water still 102 may include three pipe branches connected to plurality of water purification units 112-n for supplying the hot water. However, plurality of water purification units 112-n may receive the hot water through any pipe arrangement configured within apparatus 100.

Upon receiving the hot water, the hot water is further heated in plurality of water purification units 112-n using thermal energy received from one or more thermal energy sources. The functioning of plurality of water purification units 112-n is further explained in conjunction with FIG. 5. The one or more thermal energy sources may include, but are not limited to, a hot water, a hot cooling fluid, a hot oil, an exhaust air, a refrigerant, and one or more hot exhaust gases. The one or more thermal energy sources may be received from an engine which is further explained in conjunction with FIG. 2. The engine may be, but not limited to, an Internal Combustion (IC) engine. Alternatively, the one or more thermal energy sources may be supplied in any other manner known in the art.

As a result of heating the hot water, steam and waste matter are obtained within plurality of water purification units 112-n. The waste matter may be removed from plurality of water purification units 112-n which is explained in detail in conjunction with FIG. 6. Further, the steam obtained from heating the hot water is transferred to a heat-exchanging unit 122 of water still 102. The functioning of a heat-exchanging unit is explained in detail in conjunction with FIG. 9. As shown in FIG. 1A, water purification unit 112-1, water purification unit 112-2, and water purification unit 112-3 include a steam outlet 124, a steam outlet 126, and a steam outlet 128 respectively for supplying the steam to heat-exchanging unit 122. The steam may be transferred from steam outlet 124, steam outlet 126, and steam outlet 128 to heat-exchanging unit 122 using one or more pipes. Thus, the steam may be transferred using the one or more pipes such as, a pipe 130, a pipe 132, and a pipe 134 connected to steam outlet 124, steam outlet 126, and steam outlet 128, respectively. Thereafter, the steam is supplied to one or more pipes of heat-exchanging unit 122.

In another embodiment, a single pipe having one or more pipe branches may be connected to steam outlet 124, steam outlet 126, and steam outlet 128 for transferring the steam. For example, the single pipe may include three pipe branches connected to steam outlet 124, steam outlet 126, and steam outlet 128 for supplying the steam to heat-exchanging unit 122. However, apparatus 100 may include one or more pipes configured or arranged in any manner to transfer the steam from plurality of water purification units 112-n to heat-exchanging unit 122. Upon transferring the steam from plurality of water purification units 112-n, the steam is condensed to obtain purified water within heat-exchanging unit 122. The process of condensation of the steam to obtain the purified water within heat-exchanging unit 122 is explained in detail in conjunction with FIG. 9.

Figure 2:
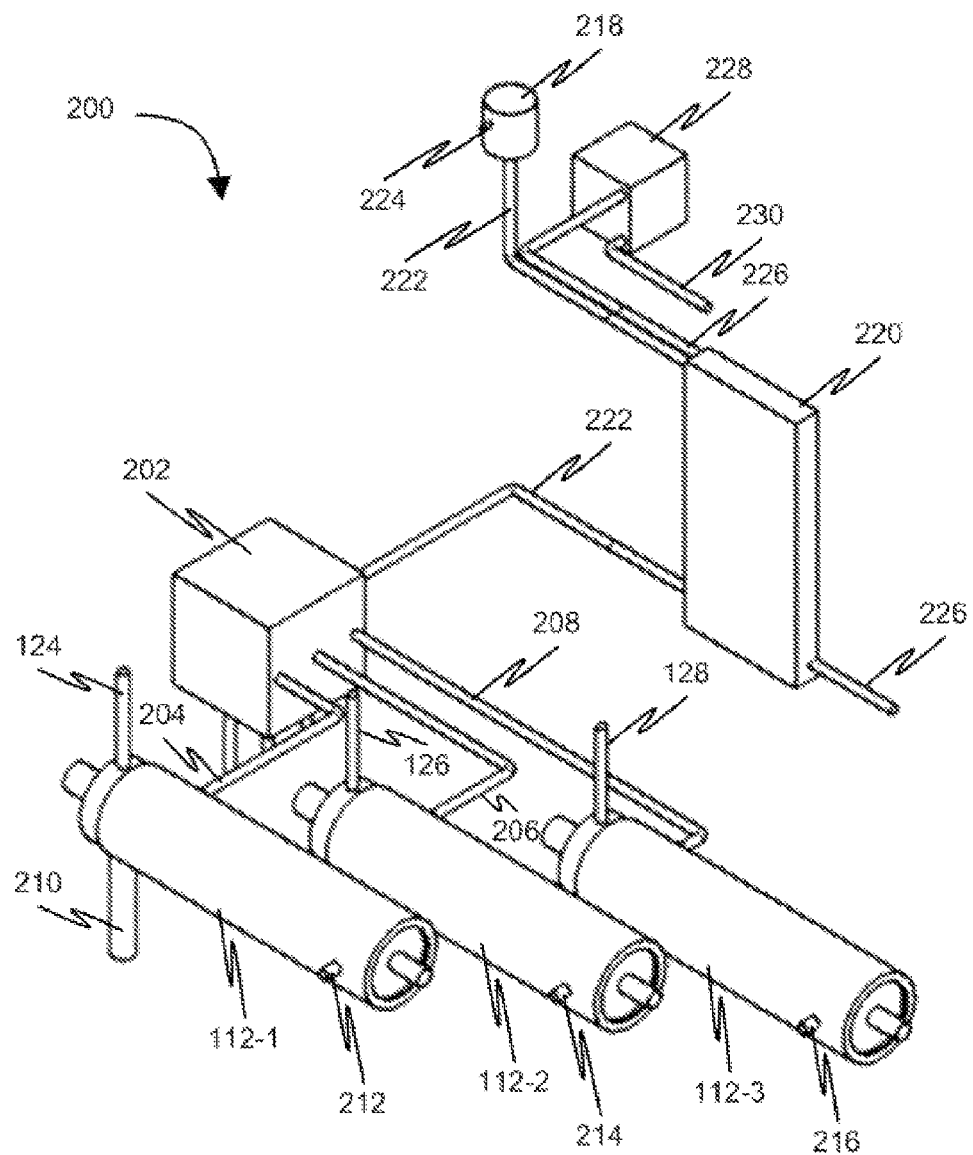
FIG. 2 illustrates one or more water purification units connected to an engine for receiving one or more thermal energy sources for purifying water in accordance with an embodiment of the invention.

Now referring back to the one or more thermal energy sources supplied to plurality of water purification units 112-n for heating the hot water received from a water still such as, water still 102. These thermal energy sources may be obtained from different supply resources such as, an engine. In this case, the thermal energy sources that are obtained may include one or more liquids, a hot water, a hot cooling fluid, and a hot oil. FIG. 2 illustrates plurality of water purification units 112-n connected to an engine 202 for receiving one or more thermal energy sources for purifying water in accordance with an embodiment of the invention. An engine such as, engine 202 may be, but not limited to, an internal combustion engine. Engine 202 may be connected to water purification unit 112-1, water purification unit 112-2 and water purification unit 112-3 using a pipe 204, a pipe 206 and a pipe 208, respectively. However, engine 202 may be connected to plurality of water purification units 112-*n* using one or more pipes arranged in any fashion.

The one or more thermal energy sources may be obtained from one or more fluids. Engine 202 receives the one or more fluids through one or more inlet pipes (not shown in FIG. 2 for ease of representation). The one or more fluids may be, but not limited to, water, a cooling fluid, a refrigerant and an engine oil. Once engine 202 operates, the one or more fluids may be heated to obtain the one or more hot fluids such as, a hot water, a hot cooling fluid, and a hot oil. In addition, one or more hot exhaust gases may be obtained in response to operation of engine 202. The one or more hot liquids and the one or more hot exhaust gases may be used as the one or more thermal energy sources to be supplied to the one or more water purification units.

For example, pipe 204 may receive a hot cooling fluid from engine 202 and supply the hot cooling fluid to water purification unit 112-1. Similarly, pipe 206 and pipe 208 may receive hot water and a hot engine oil respectively from engine 202 and supply the hot water and the hot engine oil to water purification unit 112-2 and water purification unit 112-3, respectively.

The one or more thermal energy sources received are then used to convert the hot water into steam within plurality of water purification units 112-*n*. As shown in FIG. 2, the hot water is heated in plurality of water purification units 112-*n* to obtain the steam at steam outlet 124, steam outlet 126, and steam outlet 128. The steam thus obtained may be then transferred through steam outlet 124, steam outlet 126, and steam outlet 128 to one or more pipes of heat-exchanging unit 122 as explained in conjunction FIG. 1A. Thereafter, the steam is condensed to obtain purified water within heat-exchanging unit 122. The method of condensation of steam to obtain the purified water within heat-exchanging unit 122 is explained in detail in conjunction with FIG. 9.

Further, once the hot water is heated to obtain the steam in plurality of water purification units 112-*n*, waste matter may be obtained as residue. The waste matter may be then removed from plurality of water purification units 112-*n*. The waste matter may be obtained as a solid matter. The solid matter may be present in one or more states including, but not limited to, a suspended state, a colloidal state, and a dissolved state. Examples of solid matter may include, but are not limited to, salts, organic matter, sand, and silt. The process of removing the waste matter is explained in detail in conjunction with FIG. 6. The waste matter obtained within water purification unit 112-1 is removed through a waste matter outlet 210 of water purification unit 112-1. Similarly, the waste matter obtained within water purification unit 112-2 and water purification unit 112-3 may be removed from their respective waste matter outlets (not shown in FIG. 2 for ease of representation).

Once the one or more thermal energy sources are used for heating the hot water, these thermal energy sources are transferred from plurality of water purification units 112-*n*, through a thermal energy source outlet 212, a thermal energy source outlet 214, and a thermal energy source outlet 216, respectively to one or more pipes of heat-exchanging unit 122. In an embodiment, the one or more thermal energy sources received at the one or more pipes of heat-exchanging unit 122 may be transferred back to one or more inlet pipes of engine 202 for reusing the one or more thermal energy sources. The one or more thermal energy sources are reused subsequent to cooling the one or more thermal energy sources in heat-exchanging unit 122. A pipe arrangement used for supplying the one or more thermal energy sources to engine 202 is explained in conjunction with FIG. 12.

Figure 3:
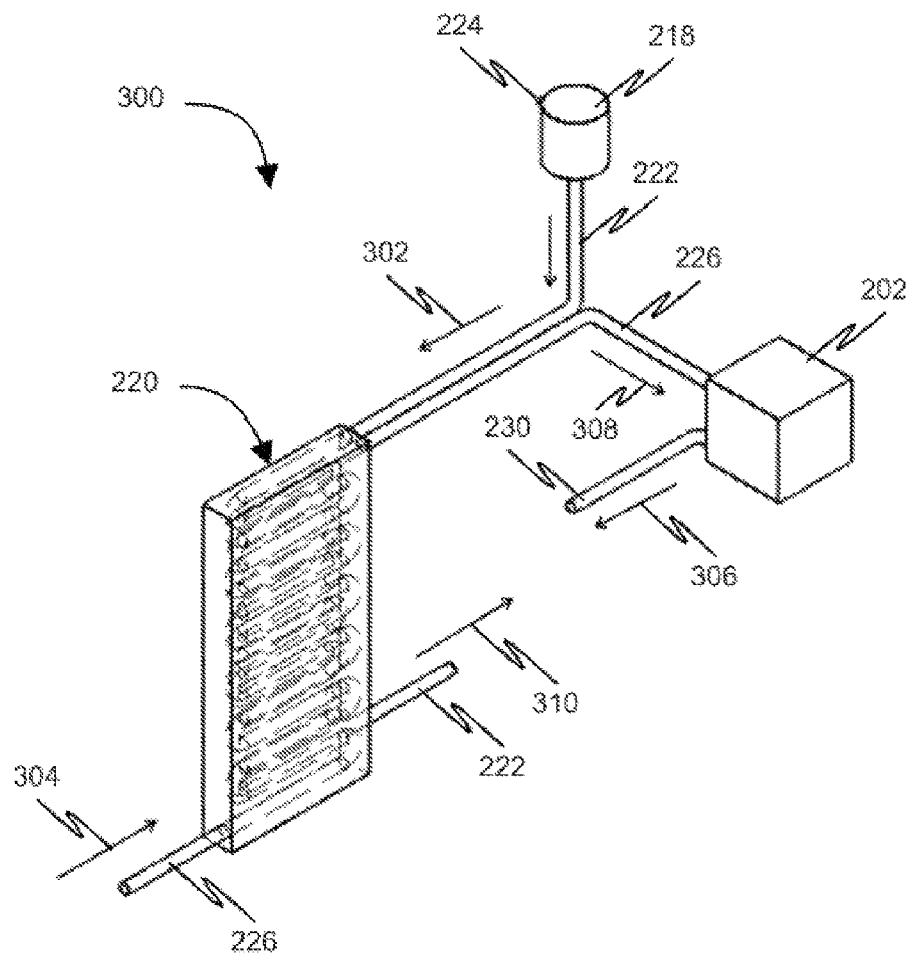
FIG. 3 illustrates a heat exchanger connected with a carburetor and an air-cooling unit in accordance with an embodiment of the invention.

Engine 202 operates using a mixture of air and fuel. The fuel may be one of, but not limited to, a liquid fuel and a compressed gaseous fuel. Examples of the fuel may include, but are not limited to, methane and Liquefied Petroleum Gas (LPG). In an embodiment, the mixture of air and fuel may be obtained from a carburetor such as, carburetor 218. Carburetor 218 is connected to engine 202 through a heat exchanger 220 using a pipe 222. In an embodiment, carburetor 218 may include an air inlet 224 for receiving the air and a fuel inlet for receiving the fuel (The fuel inlet is not shown in FIG. 2 for ease of representation). Alternatively, carburetor 218 may include an inlet such as, inlet 224 for receiving the mixture of air and fuel. Upon receiving the mixture of air and fuel, a pressure drops in carburetor 218 due to suction. As a result, temperature of the mixture of air and fuel is reduced. The mixture of air and fuel may have a temperature less than a room temperature thereby having a cooling effect. Carburetor 218 supplies the mixture of air and fuel to heat exchanger 220 using pipe 222. The direction of flow of the mixture of air and fuel is indicated by an arrow 302 as shown in FIG. 3. Heat exchanger 220 is also connected to a pipe 226 of the one or more pipes connected to a heat-exchanging unit such as, heat-exchanging unit 122. Heat exchanger 220 receives the one or more thermal energy sources from heat-exchanging unit 122 through pipe 226 in a direction indicated by an arrow 304 as shown in FIG. 3. The mixture of air and fuel and the one or more thermal energy sources flow in a heat-exchanging relationship with each other within heat-exchanging unit 122. As a result, a heat transfer occurs between the mixture of air and fuel and the one or more thermal energy sources. During the heat transfer, the one or more thermal energy sources are cooled.

Figure 4:
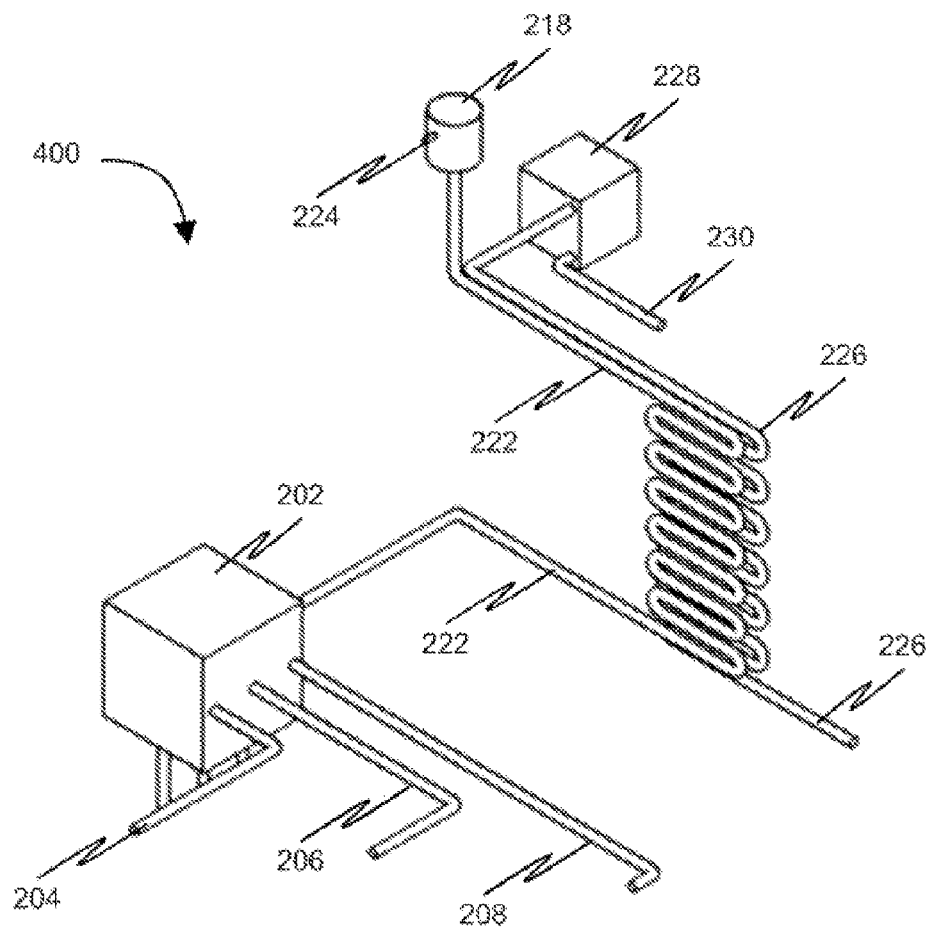
FIG. 4 illustrates a plurality of pipes of a heat exchanger arrangement in heat-exchanging relationship in accordance with an embodiment of the invention.

For example, heat exchanger 220 may receive an exhaust air from heat-exchanging unit 122 through pipe 226. The exhaust air may be received from an air-cooling unit 228. The exhaust air may be circulated through heat-exchanging unit 122 prior to supplying the exhaust air to heat exchanger 220. In this case, the exhaust air supplied may be in a cooled stage after circulation within heat-exchanging unit 122. In this case, air-cooling unit 228 is connected to heat-exchanging unit 122 using a pipe 230 for supplying the exhaust air to heat-exchanging unit 122. The connection between air-cooling unit 228 and heat-exchanging unit 122 using pipe 230 is not shown in FIG. 2 and FIG. 3 for ease of representation. Air-cooling unit 228 supplies the exhaust air to heat-exchanging unit 122 in a direction indicated by an arrow 306 as shown in FIG. 3. Pipe 222 and pipe 226 are arranged in a heat-exchanging manner in heat exchanger 220 as shown in FIG. 3 and FIG. 4. This arrangement of pipe 222 and pipe 226 facilitates transfer of thermal energy between the exhaust air and the mixture of fuel and air. Further, it will be apparent to a person skilled in the art that pipe 222 and pipe 226 may be arranged in any fashion for facilitating the heat transfer between the exhaust air and the mixture of fuel and air. As a result of the transfer of thermal energy, a cooled air and a hot mixture of fuel and air are obtained. The cooled air is then supplied to air-cooling unit 212 using pipe 226 in a direction indicated by an arrow 308 as shown in FIG. 3. Whereas, the hot mixture of fuel and air is supplied to engine 202 using a pipe 222 in a direction indicated by an arrow 310 as shown in FIG. 3.

In another example, heat exchanger 220 may receive a hot compressed refrigerant from heat-exchanging unit 122 through pipe 226. The hot compressed refrigerant may be circulated through heat-exchanging unit 122 prior to supplying to heat exchanger 220. Air-cooling unit 228 supplies the hot compressed refrigerant to heat-exchanging unit 122 in a direction indicated by an arrow 306 as shown in FIG. 3. Further, the arrangement of pipe 222 and pipe 226 facilitates transfer of thermal energy between the hot compressed refrigerant and the mixture of fuel and air.

Figure 5:
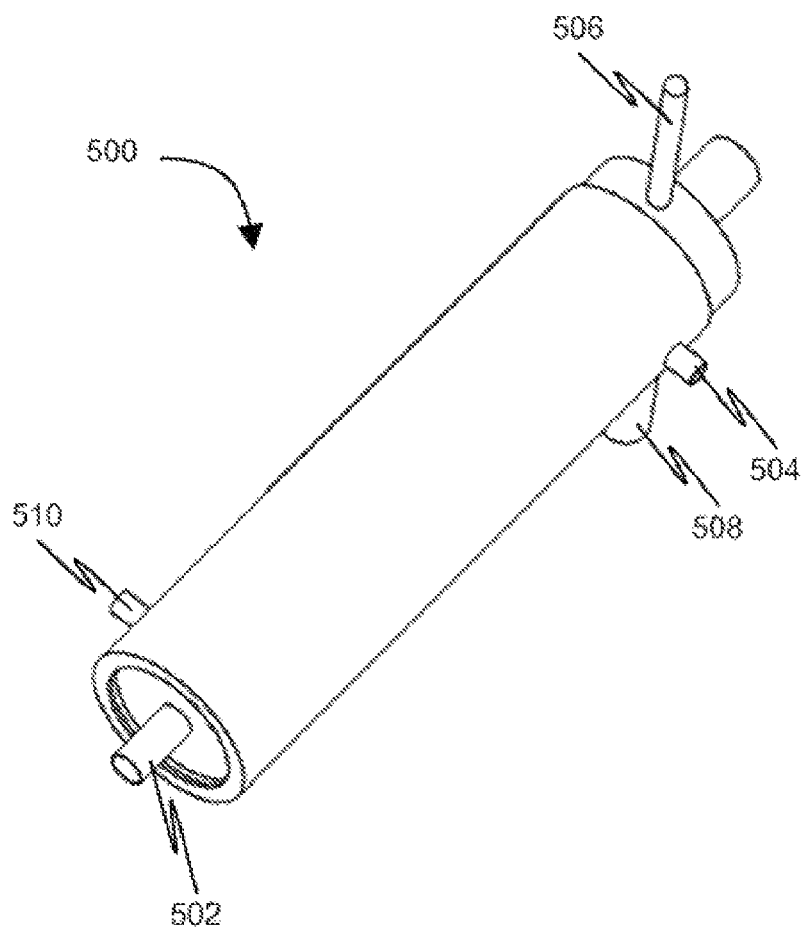
FIG. 5 illustrates a water purification unit capable of purifying water in accordance with an embodiment of the invention.
Figure 6:
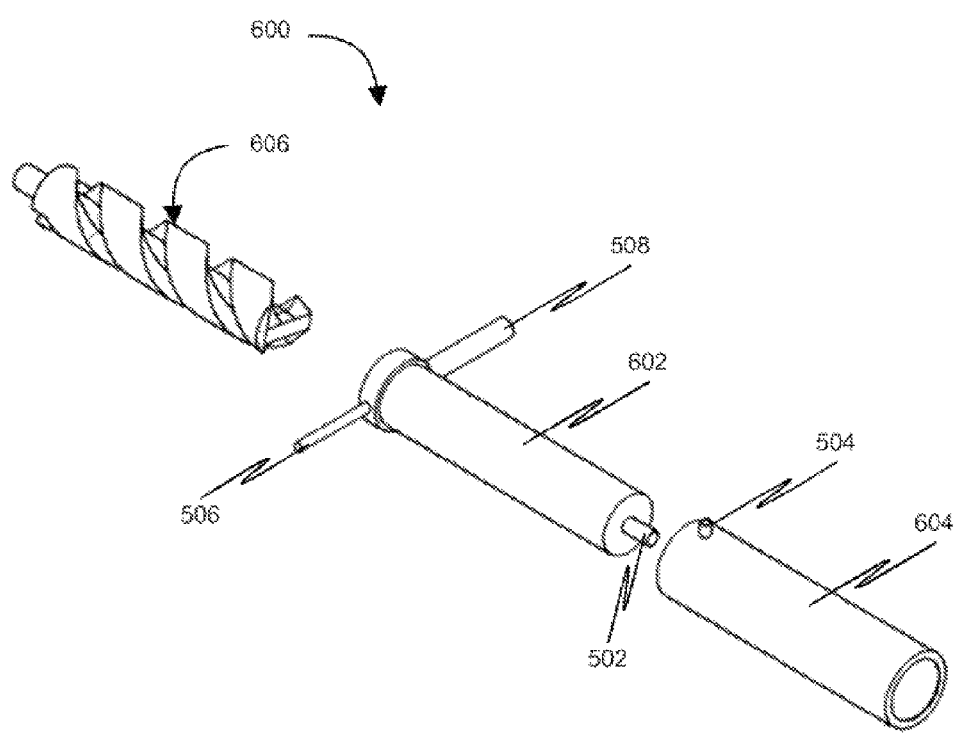
FIG. 6 illustrates an exploded view of a water purification unit in accordance with an embodiment of the invention.

FIG. 5 illustrates a water purification unit 500 capable of purifying water in accordance with an embodiment of the invention. Water purification unit 500 includes a first channel 602 capable of receiving hot water from a water still such as, water still 102 as shown in FIG. 6. The method of transferring the hot water from the water still to a water purification unit is explained in detail in conjunction with FIG. 1B. Water purification unit 500 receives the hot water in first channel 602 from a hot water inlet 502. Further, water purification unit 500 includes a second channel 604 capable of receiving the one or more thermal energy sources from an engine such as, engine 202. The one or more thermal energy sources may include, but are not limited to, a hot water, a hot cooling fluid, a hot oil, an exhaust air, a refrigerant, and one or more hot exhaust gases. In an embodiment, the one or more thermal energy sources may be received from an engine which is explained in detail in conjunction with FIG. 2. Second channel 604 receives the one or more thermal energy sources through a thermal energy source inlet 504 connected to second channel 604. Second channel 604 may be arranged in a heat-exchanging relationship with first channel 602.

Upon receiving the hot water and the one or more thermal energy sources in water purification unit 500, the hot water is further heated due to transfer of thermal energy from the one or more thermal energy sources to the hot water. The hot water is heated in first channel 602 of water purification unit 500. As a result of heating the hot water, the hot water vaporizes in first channel 602 to form the steam. The steam obtained is then transferred to one or more pipes of a heat-exchanging unit of a water still which is explained in detail in conjunction with FIG. 1A. The steam obtained is then transferred using a steam outlet 506 connected to first channel 602. The vaporization of the hot water within first channel 602 leaves behind waste matter in first channel 602. As a result, water purification unit 500 produces zero water rejects subsequent to conversion of the hot water into the steam. The waste matter may be continuously removed from first channel 602 using a waste removing unit 606. Waste removing unit 606 may be, but not limited to, a drill-bit type waste removing unit and a screw type waste removing unit. The waste removing unit is explained in detail in conjunction with FIG. 8. Further, the one or more thermal energy sources are transferred from water purification unit 500 to one or more pipes of heat-exchanging unit such as, heat-exchanging unit 122, which is explained in detail in conjunction with FIG. 2. The one or more thermal energy sources are transferred from water purification unit 500 by a thermal energy source outlet 510.

Figure 7:
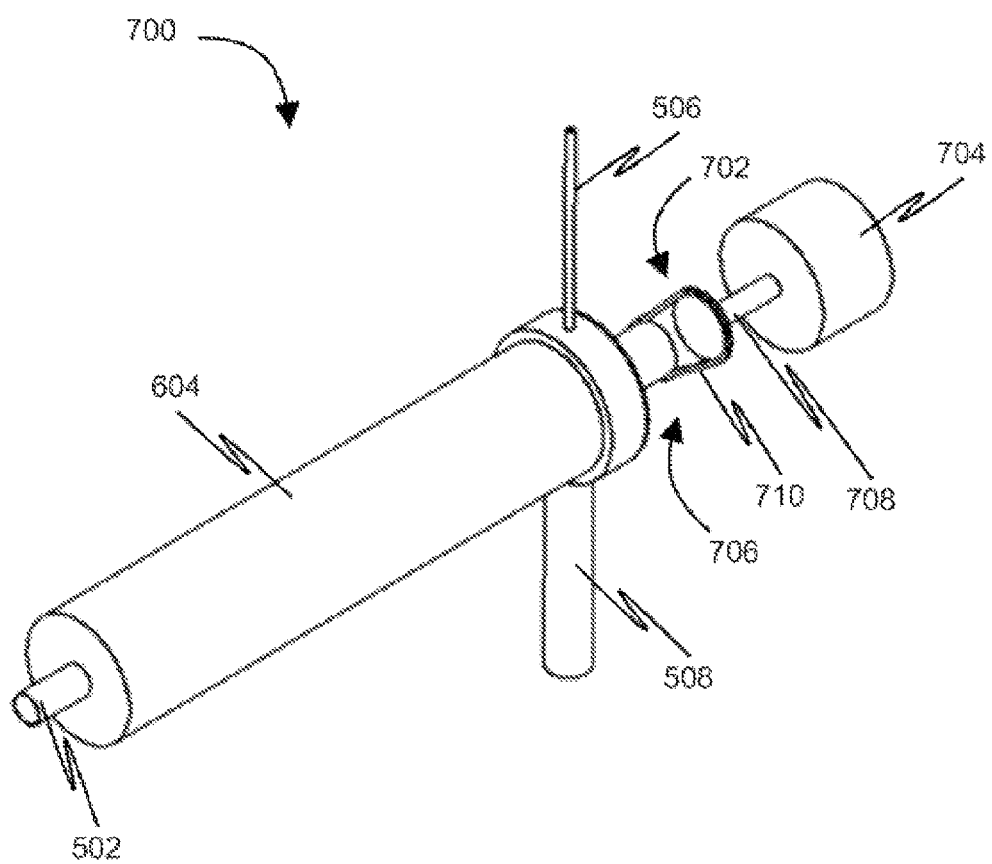
FIG. 7 illustrates a driving unit coupled to a water purification unit for operating the water purification unit in accordance with an embodiment of the invention.

As shown in FIG. 6, waste removing unit 606 may be a drill-bit type waste removing unit. Waste removing unit 606 is coupled to a driving unit 702 as shown in FIG. 7. Driving unit 702 may be, but is not limited to, a pulley driving unit, a belt driving unit, a chain driving unit, or a gear driving unit. In an embodiment, driving unit 702 may include a motor unit 704 connected to a pulley 706 through a shaft 708. Pulley 706 is connected to waste removing unit 606 using a belt 710. In this case, motor unit 704 is operated, shaft 708 rotates. Consequently, pulley 706 operates to run belt 710 in order to rotate waste removing unit 606. In another embodiment, driving unit 702 may include a motor unit connected to a gear through a shaft. The gear may be connected to a shaft of the waste removing unit using a belt. When the shaft connected to the motor unit rotates, the gear rotates to operate the shaft connected to the waste removing unit. Thus, the waste removing unit operates within a first channel such as, first channel 602 to remove the waste matter. It will be readily apparent to a person skilled in the art that driving unit 704 may be any other driving units known in the art, but not limited to a belt driving unit, a viscous torque coupling driving unit and a chain driving unit.

Figure 8:
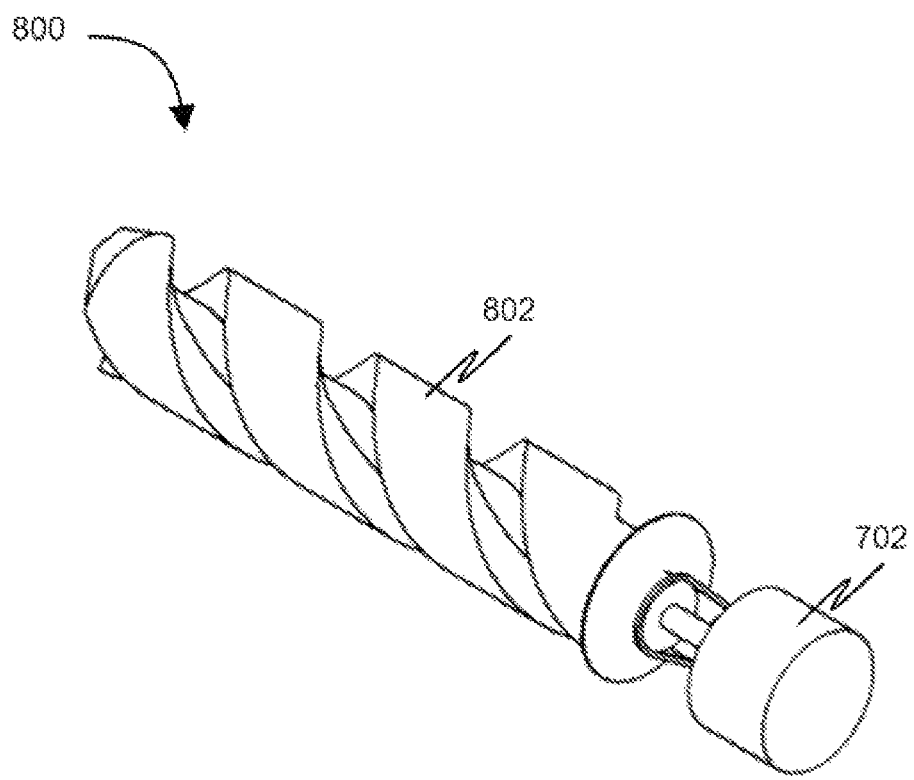
FIG. 8 exemplarily illustrates a drill-bit type waste removing unit in accordance with an embodiment of the invention.

FIG. 8 exemplarily illustrates a drill-bit type waste removing unit 800. Drill-bit type waste removing unit 800 includes one or more grooves, such as a groove 802. Drill-bit type waste removing unit 800 is driven by driving unit 702. In order to remove the waste matter from first channel 602, driving unit 702 drives drill-bit type waste removing unit 800 by rotating drill-bit type waste removing unit 800 within first channel 602. As a result of driving drill-bit type waste removing unit 800, the waste matter passes through the one or more grooves such as, groove 802 and then into waste matter outlet 508. The removal of the waste matter from first channel 602 prevents scaling and occurrence of "blow-down" in first channel 602 of water purification unit 500.

Figure 9:
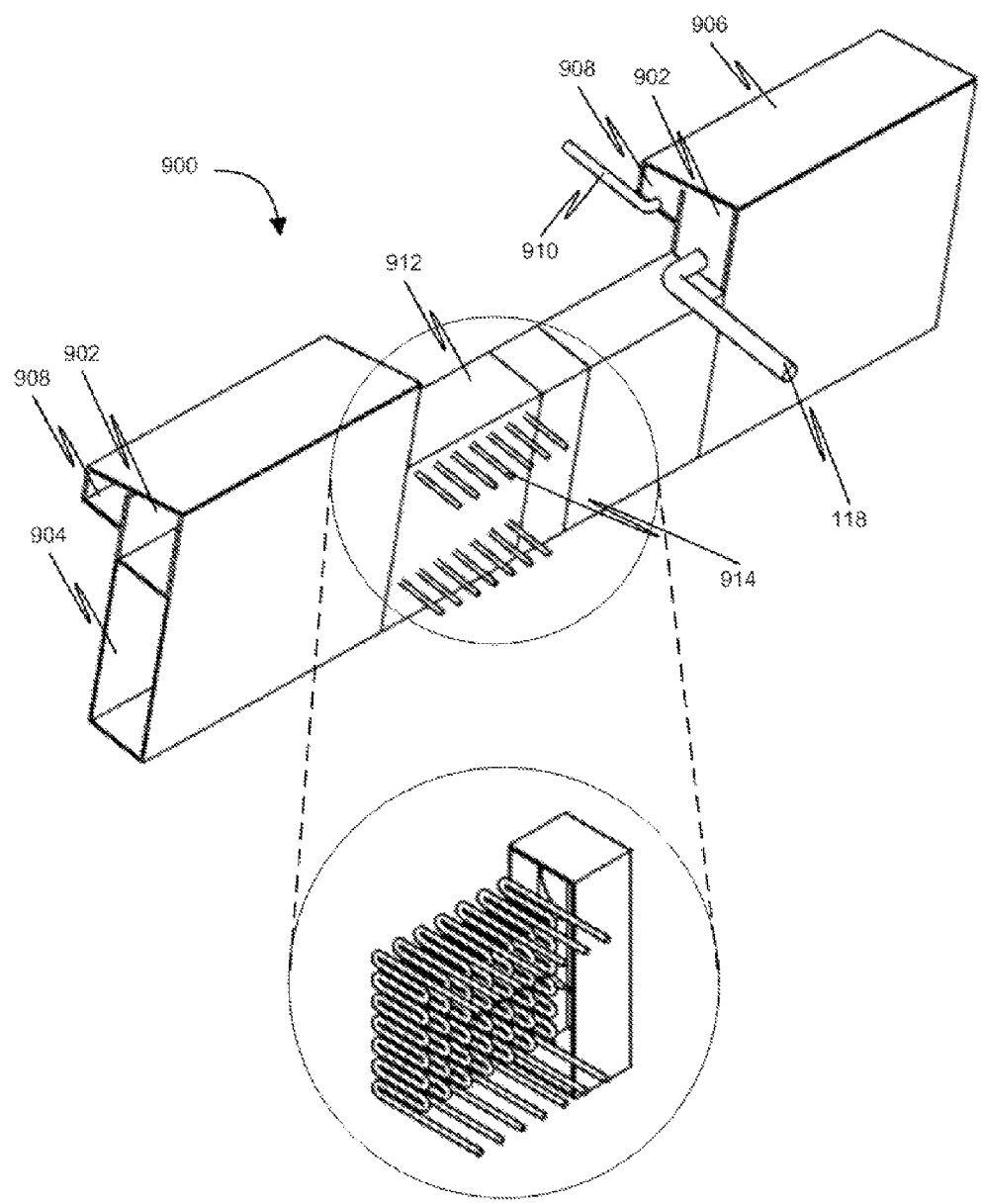
FIG. 9 illustrates a sectional view of a water still in accordance with an embodiment of the invention.
Figure 10:
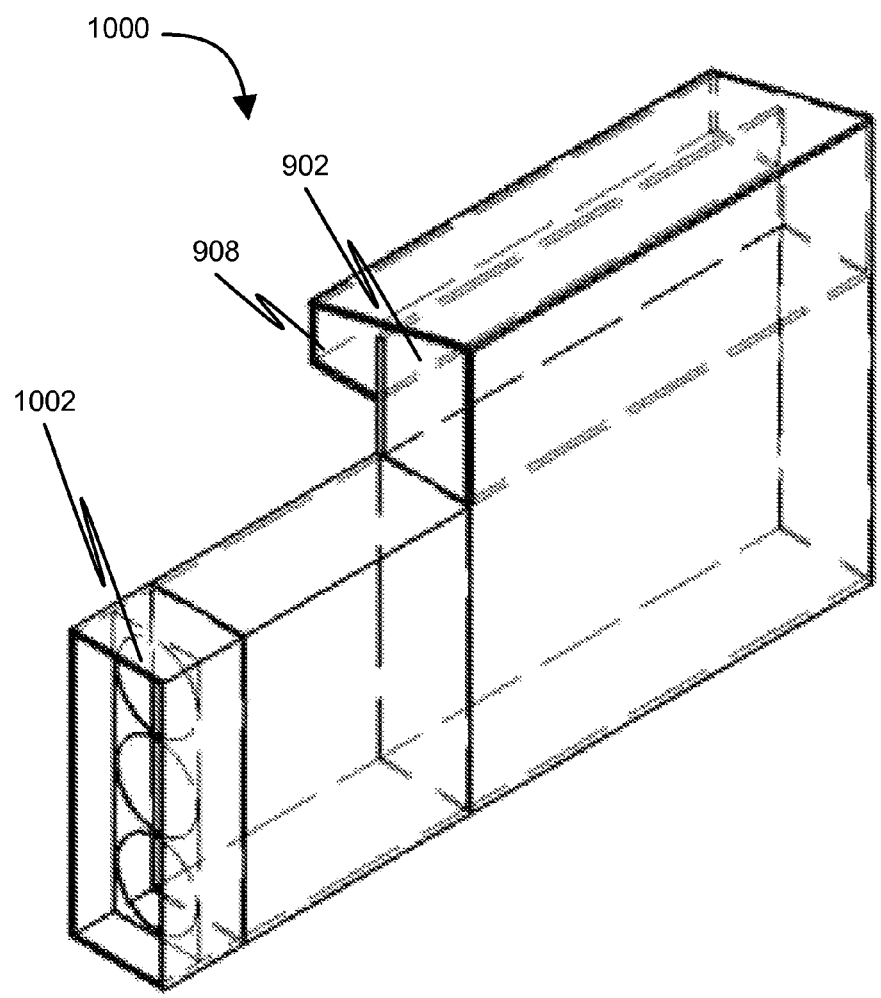
FIG. 10 illustrates an air circulation unit within a water still for circulating a hot air and a cold air in accordance with an embodiment of the invention.

FIG. 9 illustrates a sectional view of a water still 900 in accordance with an embodiment of the invention. Water still 900 includes one or more water channels for receiving water. As shown in FIG. 9, water still 900 includes a water holding unit 902 for holding the water. Water holding unit 902 receives the water using a pipe connected to water holding unit 902. (The pipe is not shown in FIG. 9 for ease of representation). Water still 900 also includes one or more air channels for circulating hot air. As shown in FIG. 9, water still 900 includes an air channel 904 for circulating the hot air. In order to circulate the hot air, air channel 904 includes an air circulation unit 1002 as shown in FIG. 10. Air circulation unit 1002 includes one or more fans for circulating the hot air and within air channel 904. In an embodiment, air circulation unit 1002 may include other circulating means for circulating the hot air within air channel 904. As a result of circulating the hot air and the water, the water is heated up to obtain water vapor, hot water, and a cold air due to transfer of thermal energy between the hot air and the water. The cold air will have a temperature lower than the temperature of the hot air. In an embodiment, the water may be heated using solar energy received by water holding unit 902. In an embodiment, water still 900 includes a slanted roof 906 covering a top section of water holding unit 902 for receiving the solar energy. Roof 906 may be but not limited to, a transparent roof. Alternatively, water still 900 includes a solar energy panel for receiving the solar energy. (The solar panel is not shown in FIG. 9 for ease of representation.) The heat energy received by the solar energy panel is then used for heating the water present in water holding unit 902.

Figure 11:
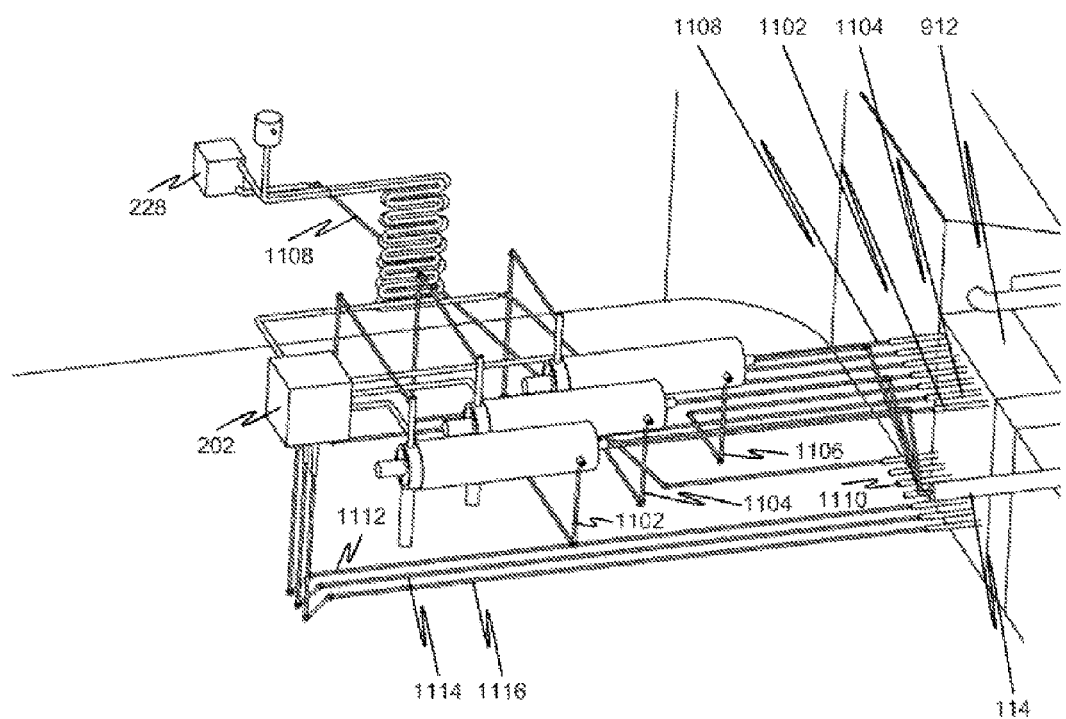
FIG. 11 illustrates a pipe arrangement within an apparatus for purifying water in accordance with an embodiment of the invention.

Upon obtaining the water vapor, the water vapor is collected within water holding unit 902. Further, the water vapor is converted into droplets of distilled water which slides through roof 906 of water holding unit 902 and reaches to a collection unit 908. The distilled water may be collected from collection unit 908 using a pipe 910 connected to collection unit 908. The hot water obtained as a result of heating the water is then transferred to a plurality of water purification units by pipe 114 for purifying the water which is already explained in conjunction with FIG. 1B. Further, the cold air obtained as a result of transfer of thermal energy between the hot air and the water in water still 900 is circulated within water still 900. The cold air is circulated within water still 900 using air circulation unit 1002. The cold air is further converted into a hot air using a heat-exchanging unit 912 present in water still 900 as shown in FIG. 9. Heat-exchanging unit 912 receives steam from one or more water purification units which is already explained in conjunction with FIG. 2. Heat-exchanging unit 912 receives steam from the one or more water purification units at an inlet 914 which is already explained in conjunction with FIG. 1A. Further, heat-exchanging unit 912 receives one or more thermal energy sources from the one or more water purification units. As shown in FIG. 11, heat-exchanging unit 912 receives one or more thermal energy sources through an inlet pipe 1102, an inlet pipe 1104, and an inlet pipe 1106 of heat-exchanging unit 912. Heat-exchanging unit 912 also receives an exhaust air from air-cooling unit 228 via an inlet pipe 1108. Upon receiving the steam, one or more thermal energy sources, and the exhaust air, a thermal energy is transferred to the cold air present in air channel 904 to obtain the hot air. The hot air obtained is further circulated in air channel 904 using air circulation unit 1002. As a result of the transfer of the thermal energy, the steam is condensed to obtain purified water. The purified water may be collected from an inlet pipe 1110. In addition, the one or more thermal energy sources may be transferred from an outlet pipe 1112, an outlet pipe 1114, and an outlet pipe 1116 to engine 202 as shown in FIG. 11. (As shown in FIG. 11, some pipes such as, pipes transferring steam from the one or more water purification units, and other elements are not provided with numerals for ease of representation. However, these pipes and the other elements are described in detail in conjunction with previous figures.)

Figure 12:
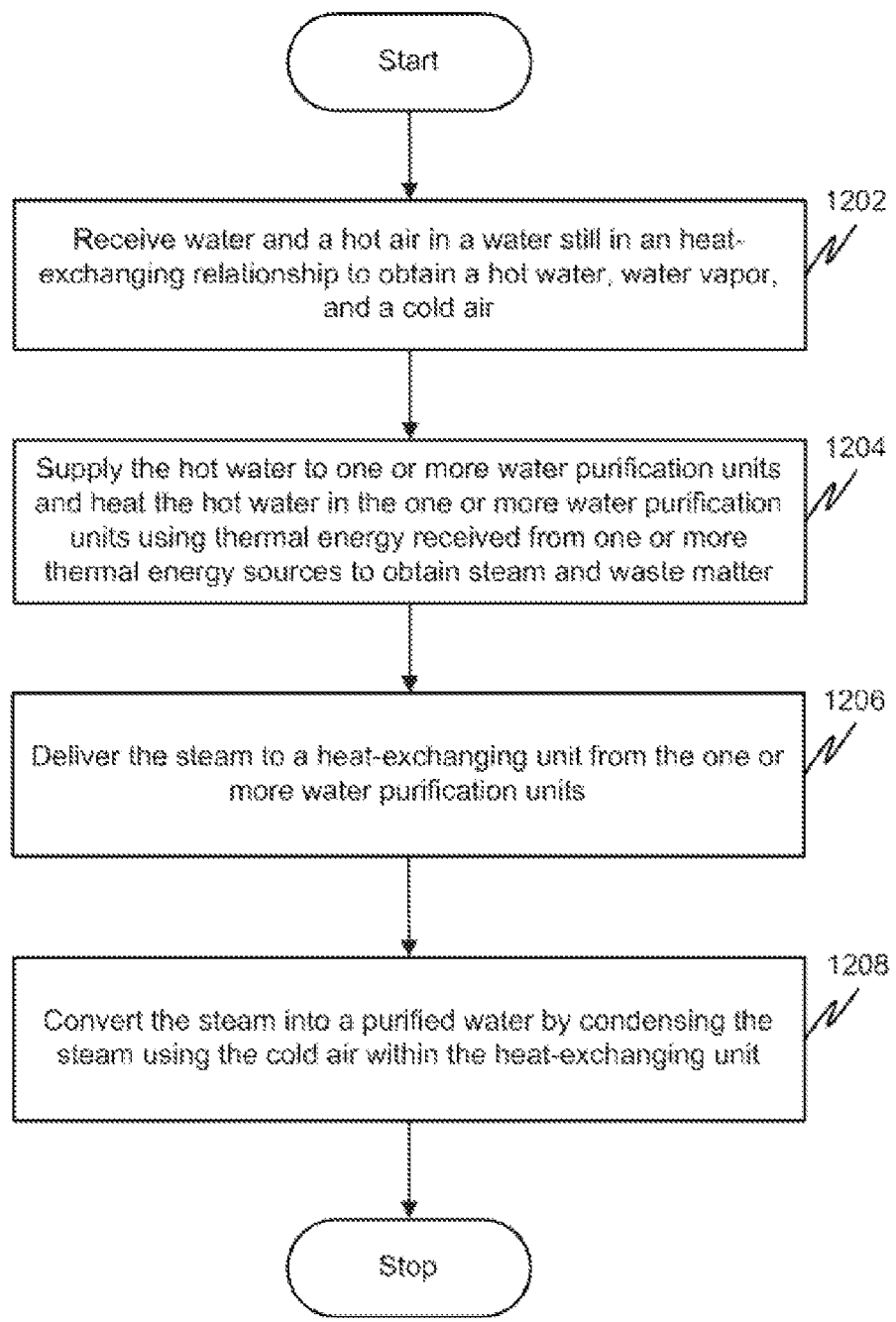
FIG. 12 illustrates a flowchart of a method of purifying water in accordance with an embodiment of the invention.

FIG. 12 illustrates a flowchart of a method of purifying water in accordance with an embodiment of the invention. The water to be purified may be received from external sources. For example, the water may include, but is not limited to, salt water, contaminated water, raw water, brine water, and sewage water. As shown in FIG. 12, water and a hot air are received in a water still in a heat-exchanging relationship at step 1202. Due to the heat-exchanging relationship between the water and the hot air, the water is heated to obtain a hot water, water vapor and a cold air. In an embodiment, the water may be heated using solar energy received by the water still. The water vapor obtained is condensed to obtain distilled water in the water still. Further, the hot water obtained in the water still is supplied to one or more water purification units at step 1204. Upon receiving the hot water, the hot water is heated in the one or more water purification units using thermal energy received from one or more thermal energy sources. The one or more thermal energy sources may include, but are not limited to, a hot water, a hot cooling fluid, a hot oil, an exhaust air, a refrigerant and one or more hot exhaust gases. In an embodiment, the one or more thermal energy sources are obtained from an engine.

As a result of heating the hot water in the one or more water purification units, steam and waste matter are obtained. The waste matter obtained may be removed from the one or more water purification units. Thereafter, the steam is delivered from the one or more water purification units to a heat-exchanging unit included in the water still at step 1206. Upon receiving the steam, the steam is converted into purified water by condensing the steam within the heat-exchanging unit using the cold air at step 1208. As a result of conversion of the steam into purified water, thermal energy of the steam is transferred to cold air to obtain hot air.

Once the one or more thermal energy sources are utilized for heating the hot water in the one or more water purification units, the one or more thermal energy sources are received at the heat-exchanging unit such as, heat-exchanging unit 122. Upon receiving the one or more thermal energy sources, a thermal energy is transferred between the cold air and the one or more thermal energy sources within the heat-exchanging unit to obtain the hot air.

Various embodiments of the invention provide a method and apparatus for purifying water. The apparatus includes a water still for receiving water and a hot air. The water and the hot air are maintained in a heat-exchanging relationship within the water still to obtain a hot water, water vapor, and a cold air. The water vapor is then condensed into a distilled water within the water still by reusing the cold air obtained in response to transfer of thermal energy from the hot air to the water. The apparatus also includes one or more water purification units configured to receive the hot water from the water still. Upon receiving the hot water, the hot water is further heated in the one or more water purification units using thermal energy received from one or more thermal energy sources to obtain steam and waste matter with zero water reject. The one or more thermal energy sources are obtained from an efficient energy source such as an engine. The one or more thermal energy sources are then reused for heating the hot water in the one or more water purification units. A water purification unit of the one or more water purification units includes a waste matter remover for efficiently removing the waste matter from the water purification unit thereby avoiding scaling and "blow-down in the one or more water purification units. Further, the steam obtained at the one or more water purification units is transferred to a heat-exchanging unit included in the water still. The steam is then condensed within the heat-exchanging unit to obtain purified water. The steam is condensed by reusing the cold air obtained in the water still by transferring the thermal energy from the steam to the cold air.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of reusing thermal energy while purifying water, the method comprising:
   receiving a water and waste mixture in one or more purification units;
   transferring an engine heat of an engine via a hot fluid to the one or more purification units to convert the water and waste mixture to a steam and a waste;
   via first pipe loops of a heat exchanger, transferring a remaining engine heat in the hot fluid from the one or more purification units to an air channel in contact with the heat exchanger, the air channel circulating a hot gas in a first loop direction in the air channel;

via second pipe loops of the heat exchanger, transferring a steam heat of the steam from the one or more purification units to the air channel;

collecting a first condensation of distilled water of the steam from the second pipe loops of the heat exchanger;

circulating the water and waste mixture, prior to being received in the one or more purification units, in a water channel disposed above the air channel, the water channel circulating the water and waste mixture in a second loop direction, wherein the water and waste mixture are heated by the remaining engine heat and the steam heat in the hot gas circulating in the first loop direction in the air channel below the water channel;

condensing a water vapor from the water and waste mixture circulating in the water channel on a slanted roof of the water channel;

collecting a second condensation of distilled water from the slanted roof of the water channel;

transferring the water and waste mixture heated by the hot gas in the air channel to the one or more purification units; and transferring the hot fluid from the first pipe loops back to the engine.

2. The method of claim 1 further comprising removing the waste from the one or more purification units.

3. The method of claim 1, wherein the hot fluid is selected from the group consisting of a hot water, a hot oil, an exhaust air, and a hot exhaust gas.

4. The method of claim 1 further comprising circulating a mixture of a fuel and an air in a heat-exchanging relationship with the hot fluid received from the second pipe loops of the heat exchanger to obtain a heated mixture of fuel and air, wherein the heated mixture of fuel and air is supplied to the engine.

* * * * *